United States Patent [19]

Rosensweig et al.

[11] Patent Number: 4,579,173
[45] Date of Patent: Apr. 1, 1986

[54] MAGNETIZED DRIVE FLUIDS

[75] Inventors: Ronald E. Rosensweig, Summit, N.J.; Markus Zahn, Lexington, Mass.

[73] Assignee: Exxon Research and Engineering Co., Florham Park, N.J.

[21] Appl. No.: 537,935

[22] Filed: Sep. 30, 1983

[51] Int. Cl.⁴ .................... E21B 43/22; C10B 1/04
[52] U.S. Cl. ............................ 166/248; 166/274; 166/275; 208/11 LE; 252/8.55 D
[58] Field of Search ............ 166/65 M, 248, 252, 166/273, 274, 275; 208/11 LE; 252/8.55 D

[56] References Cited

U.S. PATENT DOCUMENTS

| | | | |
|---|---|---|---|
| 3,377,275 | 4/1968 | Michalski et al. | 252/8.55 D X |
| 3,531,413 | 9/1970 | Rosensweig | 252/62.62 |
| 3,724,543 | 4/1973 | Bell et al. | 166/248 |
| 3,848,671 | 11/1974 | Kern | 166/248 |
| 3,917,538 | 11/1975 | Rosensweig | 252/62.51 |
| 4,136,014 | 1/1979 | Vermeulen et al. | 208/11 LE |
| 4,330,418 | 5/1982 | Glinsmann et al. | 166/252 X |
| 4,347,118 | 8/1982 | Funk et al. | 208/11 LE |
| 4,380,266 | 4/1983 | Wellington | 166/252 |
| 4,450,909 | 5/1984 | Sacuta | 166/248 |

FOREIGN PATENT DOCUMENTS 641074  1/1979  U.S.S.R. ........................... 166/65 M

OTHER PUBLICATIONS

Saffman and Taylor, Proc. Royal Soc. A., 245; 312–329 (1958).
Rosensweig, Zahn Vogler, "Thermomechanics of Magnetic Fluids", B. Berkovsky, editor, McGraw Hill, 1978, pp. 195–211.
Zahn and Rosensweig, IEEE Transactions on Magnetics, vol. MAG-16, No. 2, Mar. 1980, pp. 275–282.

Primary Examiner—George A. Suchfield
Attorney, Agent, or Firm—James H. Takemoto; E. Thomas Wheelock

[57] ABSTRACT

A process for the recovery of a fluid from a porous formation whereby fingering effects are controlled by applied magnetic field. The process comprises injecting a displacement fluid and ferrofluid, or a ferrofluid-containing displacement fluid, in an effective amount to displace fluid from the formation, applying a magnetic field containing a gradient of field intensity across said formation, driving the displaced fluid through the formation and recovering the displaced first fluid.

8 Claims, 4 Drawing Figures

MAGNETIZED DRIVE FLUIDS

BACKGROUND OF THE INVENTION

1. Field of the Invention

This invention relates generally to the stabilization of fluid interfaces between a displaced fluid and a drive fluid. More specifically, a ferromagnetic fluid is employed as a driving fluid to control fingering effects at the interface between fluids of differing viscosities in the presence of a magnetic field containing a gradient of field intensity across the fluid interface.

2. Description of the Prior Art

Saffman and Taylor, *Proc. Royal Soc. A.*, 245; 312-329 (1958), have shown that when a viscous fluid is driven through the voids of a porous medium by a less viscous fluid, the interface between the two fluids can be unstable for sufficiently high velocity. Rosensweig, Zahn and Vogler, "Thermomechanics of Magnetic Fluids", B. Berkovsky editor, McGraw Hill, 1978, pages 195-211, have analytically shown that if a layer of magnetizable fluid is used to push a more viscous fluid through a Hele-Shaw cell, the fluid interface can be stabilized using a uniform imposed magnetic field that is tangentially oriented to the interface. A Hele-Shaw cell allows flow between two parallel flat plates that are closely spaced. Tests in a Hele-Shaw cell confirmed the theoretical prediction and showed that viscous fingering can be prevented. Subsequently, Zahn and Rosensweig, IEEE Transactions on Magnetics, Vol. MAG-16, No. 2, March 1980, pp. 275-282 discuss a treatment of stability when magnetic field is uniform but obliquely oriented to the interface, in which case stabilization is less effective than for the tangential orientation.

In the field of oil recovery, fingering is a problem encountered in enhanced recovery processes including secondary and tertiary recovery techniques. Waterflooding is one of the common methods for secondary recovery. When dealing with relatively high viscosity crude oil, the process efficiency is very poor due to the tendency of the water or brine fluid to finger through and thereby bypass the more viscous oil. Moreover, much of the available oil is trapped in the formation by capillary and wettability forces. For this reason, both secondary and tertiary recovery processes may employ surfactants in the primary displacement fluid to lower the interfacial tension between water and oil to values less than about 1.0 dyne/cm.

The displacement fluid must be driven through a porous formation and if an aqueous solution is used as the driving fluid, fingering is usually observed due to differences in viscosities. In order to control fingering, it is customary to add a thickening agent, e.g., a polymer to increase the viscosity of the displacement or drive fluid and thereby minimize fingering. Polymers are subject to shear degradation and adsorption and retention in the porous medium leading to reduction of viscosity. Under other circumstances the use of polymers may lead to reduction in permeability or plugging.

SUMMARY OF THE INVENTION

It has been discovered that fingering between the drive fluid and displaced fluid in a recovery process from porous media can be avoided by using a ferrofluid as the drive fluid in combination with a suitable applied magnetic field. Accordingly, the present process for recovering a first fluid from a porous formation comprises injecting a displacement fluid in an effective amount to displace the first fluid, injecting a ferrofluid, applying a magnetic field containing a gradient of field intensity within said porous formation, driving the displacement fluid through the formation with the ferrofluid, and recovering the first fluid. In another embodiment, there is provided a process for recovering a first fluid from a porous formation which comprises injecting a ferrofluid-containing displacement fluid in an amount effective to displace the first fluid, applying a magnetic field containing a gradient of field intensity within said formation, driving the first fluid through the formation and recovering the first fluid.

By replacing a conventional thickened aqueous drive fluid with a ferrofluid in the presence of an applied magnetic field, fingering can be avoided even though the viscosity of the ferrofluid may be less than the displacement fluid. With low viscosity ferrofluid, pressure drop is relatively low, pumping costs are reduced, and displacement efficiency is increased. The ferrofluid may also function as the displacement fluid so that a separate displacement fluid may not be required.

DETAILED DESCRIPTION OF THE INVENTION

Figure 1A:
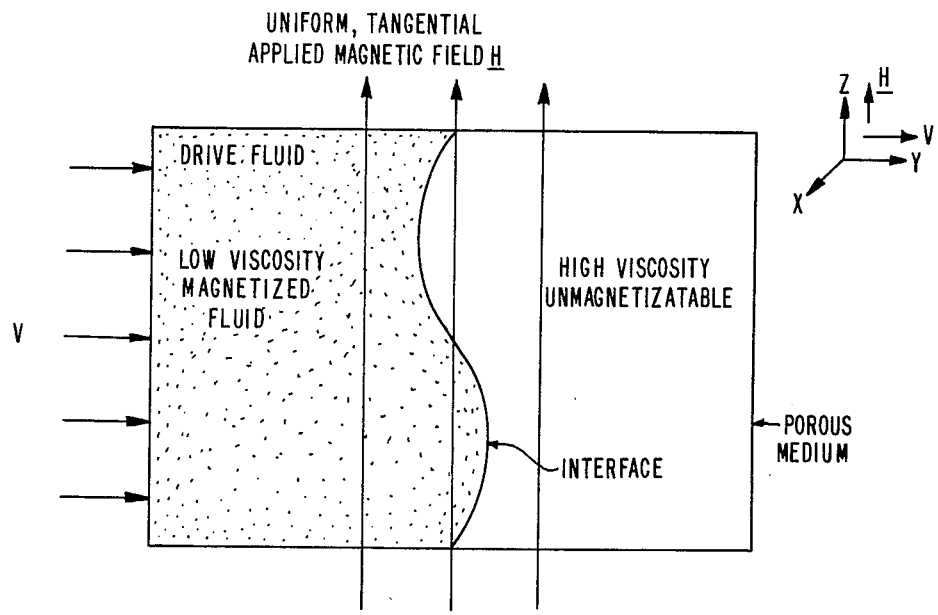
FIGS. 1A and 1B are schematic drawings showing alternate configurations of applied field relative to the advancing fluid interface.

Ferrofluids are colloidal aqueous dispersions of finely divided magnetic particles of subdomain size, i.e. from about 20 to 200 A, and are characterized by resistance to settling in the presence of gravitational or magnetic force fields and resistance for change of its liquid properties in the presence of an applied magnetic field. Ferrofluids also display superparamagnetism. The preparation and properties of ferrofluid compositions are described in U.S. Pat. Nos. 3,531,413 and 3,917,538 which are incorporated herein by reference. Preparation of ferrofluids and the laws and relationships that govern their behavior are treated in "Fluid Dynamics and Science of Magnetic Liquids", R. E. Rosensweig, Advances in Electronics and Electron Physics, Vol. 48 (1979), pp. 103-199, Academic Press.

One embodiment relates to the recovery of crude oil from an oil-bearing formation. The techniques of secondary and tertiary oil recovery are well-known and are described, e.g., in U.S. Pat. Nos. 3,399,725 and 3,983,940. These methods usually involve an optional preflush to displace or remove materials which could interfere with the surfactant, followed by an oil displacement slug containing surfactant, a thickened pusher or drive slug and an unthickened drive water.

The surfactant floods are those known in the art which contain an effective amount of surfactant to displace oil. They may be micellar solutions, microemulsions and the like. The surfactants are generally anionic, cationic, nonionic, amphoteric or mixtures thereof, and may be employed with conventional additives such as co-surfactants and thickeners.

Anionic surfactants are carboxylates, sulfonates, sulfates and esters of phosphorus acid. Sulfonate and sulfate surfactants are preferred. Ethoxylated and/or propoxylated sulfonates and sulfates are especially preferred because of their increased ability to function in the presence of high salinity brine and at elevated temperatures. Suitable cationic surfactants are amine, polyamines and quaternary ammonium salts. Preferred cationics are ethoxylated primary or secondary amines. Quaternary ammonium salts derived from the above cited primary or secondary amines are also preferred. Nonionic surfactants are ethoxylated derivatives of phenols, amines, carboxylic acids, alcohols, and mercaptans as well as polyhydroxy compounds. Ethoxylated phenols and amines are preferred. Amphoteric surfactants usually contain an amino group as the basic function and carboxylate or sulfonate group as the acidic function. These surfactants may also be ethoxylated. Preferred amphoterics contain a quaternary ammonium moiety and a sulfonate or carboxylate moiety.

In the process of the present invention, the thickened drive or pusher fluid is replaced by a ferromagnetic fluid. As noted above, ferrofluids are stable and resist settling. Moreover, the particle sizes of the magnetic materials are much smaller than the typical pores in oil-bearing formations so that plugging will not be an obvious problem. For example, the typical particle size is 10 nanometers (0.01 micron). Ferrofluids are injected in an amount sufficient to provide a magnetizable drive fluid over the area subjected to secondary or tertiary oil recovery.

Figure 1B:
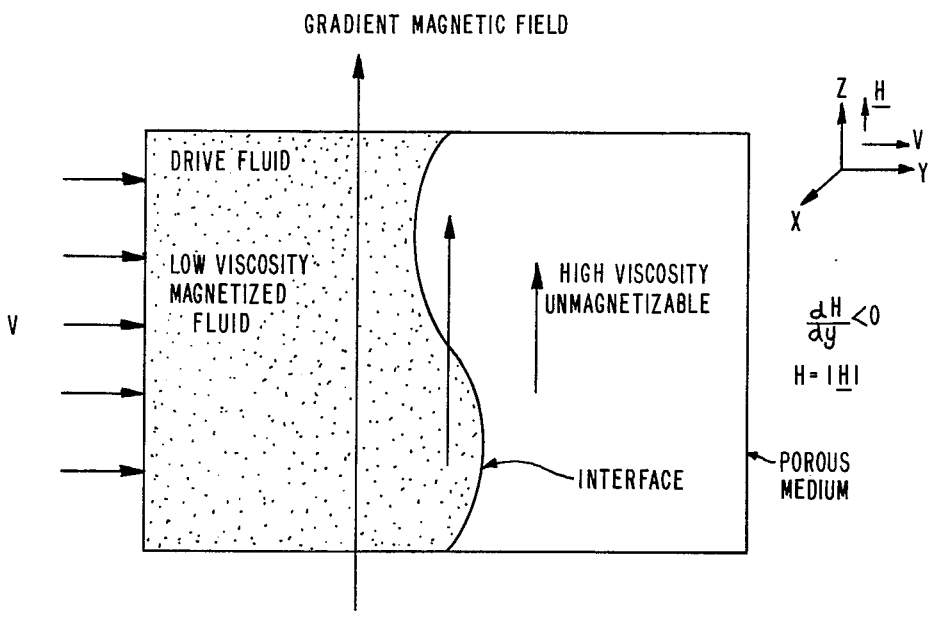

It is essential that the ferrofluid driver be employed in the presence of a gradient magnetic field extending over the interface between the displacement fluid and drive fluid. FIG. 1B illustrates the preferred configuration of the applied field which is spatially varying at the interface with field intensity increasing in the direction from the nonmagnetizable fluid toward the magnetizable fluid. A disturbance at the fluid interface experiences magnetic forces whose first order effect is similar to gravity force except that the orientation of the force need not be vertical. Magnetic forces keep the interface flat just as gravity force would keep the interface level if flow were advancing vertically. The interface is thus stabilized by the gradient field against growth of waves in either the x or z directions. In contrast, FIG. 1A depicts the partial stabilization conferred by uniform tangential magnetic field wherein the interface in the x-z plane is stabilized along field direction z but not transversely in the x-direction. The mechanism of stabilization is different and depends on the formation of induced magnetic poles at the interface when a disturbance appears. The stabilization is effective in a Hele-Shaw cell where the x direction is small, but fails in a three dimensional porous reservoir since no mechanism exists to prevent growth of waves in the x direction.

Figure 2:
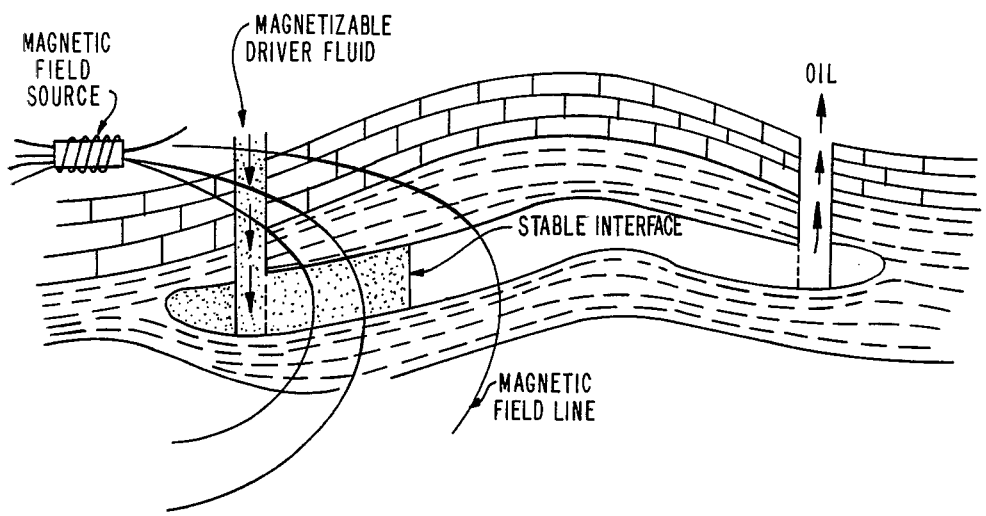
FIG. 2 is a schematic depicting the generation of a magnetic field over an oil-bearing formation.

A preferred method of generating the magnetic field is shown in FIG. 2 which schematically depicts a magnetic field generated by a current source. The current is carried through a loop of an electrical conductor which is situated such that the magnetic field decreases in intensity in the direction from the injection well towards the production well. Conduction of current in the well casing and/or in the formation provides another embodiment. Subterranean conductors may also be employed, for example in combination with induction heating means for reducing the oil viscosity. The intensity of magnetic field is generally in the range from 1 to 20,000 gauss with field gradient in excess of 0.5 gauss/cm.

Another embodiment of gradient field stabilization is in-situ extraction of kerogen from rubbleized oil shale. In either oil or kerogen production, the magnetic fluid may be combined with a microemulsion to provide the benefits of very low interfacial tension in the recovery process.

Figure 3:
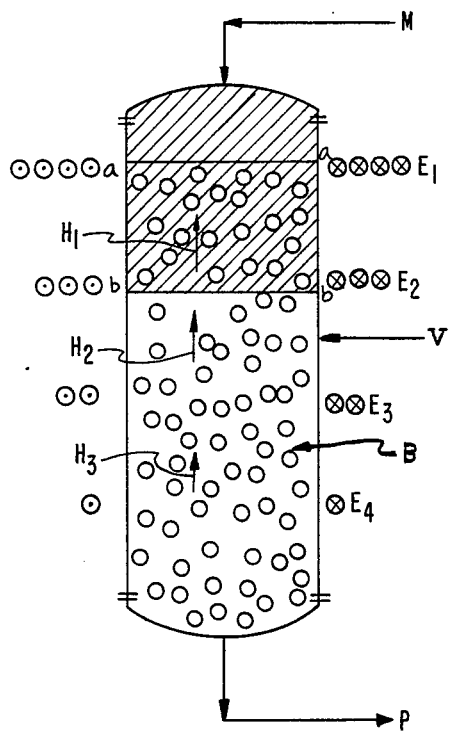
FIG. 3 is a schematic depicting the generation of a magnetic field over a bed in a vessel.

Other applications of gradient field stabilization include processes such as displacement of fluids from packed beds within process vessels. In FIG. 3 a process fluid P is displaced by a magnetic fluid M from a particle bed B having top surface a—a, said bed contained in process vessel V. Electromagnet field coils $E_1$-$E_4$ generate magnetic field having intensity that increases in the direction from the nonmagnetic process fluid toward the magnetic fluid, e.g. $H_1$ greater than $H_2$ greater than $H_3$. The interface b—b is stabilized against fingering. If normal field instability occurs at the interface b—b, a field source producing tangentially oriented field may be used instead. The flow may be downward, horizontal, inclined, or countercurrent with appropriate modification of the field gradient direction, and the process may contain side-streams, e.g., a ferrofluid-containing sidestream fed to the column. Another example is the solvent separation of bitumen from tar sands wherein the extract stream flows upward countercurrent to the descending tar sand. Due to the greater density and viscosity of the extract stream in the upper portions of the vessel, the conditions exist for fingering instability and the resultant bypassing would be detrimental to the process. This gradient field stabilization may be applied generally to stabilizing the fluid interface between a ferrofluid driver and a displaced fluid by applying a gradient magnetic field across the fluid interface.

The ferrofluid drivers and process of the invention are further illustrated by reference to the following examples.

EXAMPLES

These examples demonstrate the prevention of fingering instability in displacement of fluids from porous formations. Laboratory sandpacks are employed with magnetic fluid drivers. Applied magnetic fields are utilized that are uniform in intensity or alternatively, have uniform gradient of field intensity.

MATERIALS

It was decided to use a clean sand to prepare the sand pack as presence of clay in a sand such as Berea sand may interfere with the essential mechanism of the process and lead to an ambiguous interpretation. The sand used in these Examples is −40/50 mesh Ottawa sand.

A number of nonmagnetic fluids are employed in these Examples, including glycerol, carbon tetrachloride, Versol I which is a hydrocarbon solvent with a boiling point range of 313°-395° F. and manufactured by Exxon Chemical Co., and Dow Corning 200 silicone oil.

The magnetic fluids are composed of approximately 10 nm. colloidally dispersed magnetic iron oxide particles in a liquid carrier. Three fluids, each obtained from a different source, are utilized. These are:

Georgia-Pacific Aqueous Base
Lignosite FML
25% Fe of 40% total solids
Magnetization 100 gauss in 350 oersted applied field
U.S. Bureau of Mines Aqueous Base
Sample dated 11/80

Supplied by USBM Twin Cities Research Center
Ferrofluids Corporation Hydrocarbon-Base H01
200 gauss saturation magnetization
Lot No. PF293G.

Density and viscosity in absence of the field are recorded in Table I. Another important characteristic is field induced viscosity increase. Table I gives experimental values of viscosity obtained with a Brookfield viscometer modified to permit testing the sample in a magnetic field. Modification consisted of replacing magnetic parts of the drive with non-magnetic parts and furnishing an extension rotor to permit the drive head and read-out mechanisms to be located out of the high field region. Viscosities were determined, at 22° C. temperature and at shear rates ranging from about 0.5 to 5 sec$^{-1}$.

TABLE I
BROOKFIELD VISCOSITY DEPENDENCE ON FIELD INTENSITY AND ORIENTATION FOR THE VARIOUS MAGNETIC FLUIDS

| MAGNETIC FLUID | FIELD INTENSITY (Gauss) | FIELD ORIENTATION RELATIVE TO SPINDLE ROTATION AXIS | |
|---|---|---|---|
| | | Parallel | Perpendicular |
| Georgia-Pacific (aqueous) = 1.21 g/cc | 0 | 48* | 48* |
| | 100 | 131 | 330 |
| | 200 | 212 | 2000 |
| | 260 | — | 4400 |
| | 400 | 303 | — |
| | 600 | 333 | — |
| Bureau of Mines (aqueous) = 1.15 g/cc | 0 | 5.5 | 5.5 |
| | 100 | 5.6 | 7.4 |
| | 200 | 6.0 | 12 |
| | 400 | 9.3 | 36 |
| | 800 | 12.8 | 70 |
| | 1000 | — | 96 |
| Ferrofluidics (hydrocarbon)** = 1.04 g/cc | 0 | 5.7 | — |
| | 100 | 5.8 | 12 |
| | 200 | 5.8 | 35 |
| | 400 | 7.2 | 43 |
| | 500 | — | 47 |
| | 600 | — | — |

*Values are viscosity in centipoise
**Estimated viscosity is 48 centipoise in perpendicular field orientation of 5300 gauss.

APPARATUS

A cylindrical, transparent, thick-wall plastic tube having an inside diameter of 2.4 centimeters was used to contain a sand packing. The packed length was 6.3 centimeters. The tube was equipped with screw-on metal end caps with fittings to ¼ inch supply and effluent lines. The driving head to force fluid upwards through the vertically mounted bed was supplied by either a syringe pump (Sage Instruments Model 355) or a gravity feed reservoir. When using the syringe pump, the inlet gauge pressure was monitored and flow rate adjusted to run at nearly constant gauge pressure. Using gravity feed, nearly constant drive pressure was assured since the reservoir cross section was considerably larger than that of the bed. Effluent was collected in one, or a series, of graduated receivers (15 ml. centrifuge tubes).

Uniform field tests were done with a Helmholtz pair of air core electromagnets, both coils having 6 inch I.D. and 4 inch wound length. The field orientation is tangential to the undisturbed fluid interface in the sand pack; i.e. the orientation of field is perpendicular to the mean flow direction.

Gradient magnetic field was provided in the fringe field of a Walker iron yoke electromagnet having 24 cm. diameter pole faces. The pole faces of the electromagnet produce centerline field that is horizontal. The sand pack bed was vertically positioned with its center point 12 cm. directly above the centerline of the pole pieces. This geometry produces magnetic field that is oriented tangential to the driving interface and which possesses a gradient of magnetic field in the direction normal to the interface with field increasing from top towards the bottom of the sand pack. All tests were conducted with a magnetic field of 5200 to 5300 gauss measured at the midpoint of the bed. The field profile was measured with a Bell Model 620 Gaussmeter from which it was determined that field gradient was constant at 820 gauss/cm. over the packed bed length.

EXAMPLES 1–10

Sand packs are prepared by pouring sand at a slow rate into the tabular vessel while the vessel is rotated with a motorized drive. The sand is retained on a U.S. No. 60 screen grid (openings slightly smaller than the sand size). Bed retainer caps and feed lines are threaded to the bed vessel with a screen held pressed over the bed top with the top retainer cap. Reservoir fluid is introduced to fill the bed interstices using the syringe pump. About 20 minutes injection time is allowed to prevent trapping air in the bed. The bed feed line is filled with driver fluid and flow of driver fluid established at the desired rate. After sufficient displacement occurs, the interface between the two fluids may be observed through the vessel side wall and its appearance monitored as the test continues. The fluid produced overhead is collected in the receivers with special note taken of the cumulative flow at the point where the first drop of the driver fluid appears overhead.

Table II summarizes the sand pack test conditions and observed results. A key listing is "breakpoint" corresponding to cumulative collected volume of reservoir fluid at the point when the first drop of pusher fluid is collected. High value of "breakpoint" volume corresponds to a high sweep efficiency and absence of fingering.

Examples 1 through 5 were done in the absence of an applied laboratory field source in order to establish baseline behavior. In Example 1, a denser, more viscous fluid (glycerin) displaces a less dense, less viscous fluid (Varsol). This provides the classical setting for stable displacement according to Saffman-Taylor theory and well established practice. Indeed, the test produced a wavy but nonfingering interface that yielded a high percent recovery of the reservoir fluid (89% recovery at breakpoint).

The recovery is calculated from the data with a correction for excess reservoir-type fluid initially present in the delivery line.

$$\% \text{ Recovery} = \frac{\text{(Breakpoint volume)} - \text{(Excess volume)}}{\text{(Sand pack saturation volume)}} \times 100$$

Excess volume is 1.8 cc. and sand pack saturation volume is 11.5 cc.

In Example 2, glycerol is used to displace a much more viscous oil than in Example 1. The displaced oil, which is silicone oil, is less viscous than the glycerol so the expectation is that fingering will not occur. Indeed, the experimentally determined recovery percentage of 71% is a high value.

Example 3 deliberately creates a dynamically unstable arrangement with low viscosity ferrofluid displacing glycerol from the sand pack in the absence of magnetic field. Carbon tetrachloride was added to the ferrofluid to increase its density to a value greater than that of the glycerol to prevent Rayleigh-Taylor instability. The opaque black coloring of the ferrofluid made it well suited for flow visualization. The run resulted in rapid fingering and low recovery of 19%.

chosen to be more dense than the displaced fluid so that gravitational instability would not be a factor. Calculations made from the stabilization theory (R. E. Rosensweig, M. Zahn, and T. Vogler in *Thermomechanics of Magnetic Fluids*, Hemisphere Publishing Corporation (1978) pp. 195–211) indicated that magnetization was sufficient to prevent fingering if two-dimensional flow

TABLE II

SUMMARY OF MAGNETIC DRIVER SAND PACK TESTS

| EXAMPLE NO. | FIELD CONDITION | FIELD INTENSITY H (GAUSS) | PUSHER FLUID TYPE | DENSITY (GM/CC) | VISCOSITY CP (H=O) |
|---|---|---|---|---|---|
| 1 | Absent | — | Glycerol | 1.26 | 750 |
| 2 | Absent | — | Glycerol | 1.26 | 750 |
| 3 | Absent | — | Hydrocarbon FF + $CCl_4$ | 1.04 | 3 |
| 4 | Absent | — | Geo-Pac Aq. FF | 1.21 | 25 |
| 5 | Absent | — | Bu Min Aq. FF | 1.15 | 5.5 |
| 6 | Uniform | 475 | Bu Min Aq. FF | 1.15 | 5.5 |
| 7 | Uniform | 400 | Bu Min Aq. FF | 1.15 | 5.5 |
| 8 | Uniform | 325 | Geo-Pac. Aq. FF | 1.21 | 25 |
| 9 | Uniform | 245 | Geo-Pac. Aq. FF | 1.21 | 25 |
| 10 | Gradient | 5300 | Hydrocarbon FF | 1.04 | 5.8 |
| 11 | Gradient | 5200 | Hydrocarbon FF | 1.04 | 5.8 |
| 12 | Gradient | 5200 | Geo-Pac Aq. FF | 1.21 | 25 |

| EXAMPLE NO. | RESERVOIR FLUID TYPE | DENSITY (GM/CC) | VISCOSITY (CP) | FLOW RATE (CC/MIN) | BREAK POINT (CC) | % RECOVERY AT BREAKPOINT | FINGERING |
|---|---|---|---|---|---|---|---|
| 1 | Varsol | 0.79 | 0.95 | 0.15 | 12 | 89 | NO |
| 2 | Silicone | 0.97 | 340 | 0.05 | 10 | 71 | NO |
| 3 | Glycerol | 1.26 | 750 | 0.05 | 4 | 19 | YES |
| 4 | Silicone | 0.97 | 970 | 0.45 | 2.7 | 8 | YES |
| 5 | Silicone | 0.97 | 970 | 0.24 | 2.1 | 3 | YES |
| 6 | Silicone | 0.97 | 970 | 0.20 | 2.9 | 10 | YES |
| 7 | Silicone | 0.97 | 340 | 0.48 | <2 | <2 | YES |
| 8 | Silicone | 0.97 | 970 | 0.25 | 7.8 | 52 | NO |
| 9 | Silicone | 0.97 | 970 | 0.15 | 8.6 | 59 | NO |
| 10 | Glycerol | 1.26 | 750 | 1.0 | >5.8 | >35 | NO |
| 11 | Silicone | 0.97 | 340 | 1.6 | 8 | 54 | NO |
| 12 | Silicone | 0.97 | 970 | 0.55 | 6.1 | 37 | NO |

Example 4 is similar to Example 3 in that a ferrofluid of low viscosity displaces a less dense, higher viscosity immiscible reservoir fluid. However, the roles of organic and aqueous-like phases are interchanged relative to Example 4. This has the effect of interchanging the phase which preferentially wets the sand surface since the sand was established to be wetted preferentially by the aqueous-like phases in side tests. Again, the expected result is obtained; overall fingering takes place and a low recovery figure is obtained, in this case 8%.

Example 5 is another dynamically unstable combination, this time employing the Bureau of Mines ferrofluid. The recovery of 3% was the lowest in this series of unmagnetized drivers, consistent with the low viscosity 5.5 cp. of the pusher fluid.

In summary, Examples 1–5 establish in the absence of field that fingering occurs when expected and is prevented when that is predicted. In addition, the tests establish levels of recovery to be expected under fingering and nonfingering conditions.

Examples 6–9 were conducted with uniform field directed tangential to the undisturbed interface existing between the fluids. In each test the pusher fluid was was achieved. However, as Examples 6 and 7 illustrate, the recovery was very low; and, in fact, fingering was not prevented. Observation of the flow pattern through the transparent tube wall, as well as removal and dissection of the sand pack, showed that two-dimensional flow is not obtained and that the fingering proceeds three dimensionally. Accordingly, while uniform field stabilization had been effective in preventing fingering in studies in a two-dimensional Hele-Shaw cell, it is not effective in realistic three-dimensional formations. The results and conditions of Examples 8 and 9 at first inspection seem to belie this conclusion. However, it is found that the Georgia-Pacific ferrofluid utilized in these tests exhibits a large increase in viscosity in the presence of the field (see Table I). The viscosity increase was so large that the pusher viscosity exceeded that of the reservoir fluid so that the experiments are not valid for the purpose of demonstrating the inventive concept.

Most importantly, as illustrated in Examples 10–12, gradient magnetic field was employed to test its influence on prevention of fingering instability. Example 11 versus Example 7 gives clear evidence for the favorable influence of using gradient field stabilization; recovery improved from less than 2% to the value of 54%. Visual observations of the interface confirmed absence of any apparent fingering. Example 10 was working favorably and on the way toward yielding good recovery when the run was upset mechanically causing the sand pack to draw close to one of the Walker magnet pole pieces thereby magnetically distorting the planar fluid interface. Example 12 gave enhanced recovery although the field increase of viscosity in the Georgia-Pacific ferrofluid complicates the issue.

What is claimed is:

1. A process for recovering a first fluid from a porous subterranean formation which comprises injecting a displacement fluid in an effective amount to displace the first fluid, injecting a ferrofluid, applying a magnetic field containing a gradient of field intensity within said formation, driving the displacement fluid through the formation with the ferrofluid and recovering first fluid.

2. The process of claim 1 wherein the first fluid is an oil and the porous subterranean formation is an oil-bearing formation.

3. The process of claim 2 wherein the displacement fluid contains a surfactant.

4. A process for recovering a first fluid from a porous subterranean formation which comprises injecting a ferrofluid containing displacement fluid in an amount effective to displace the first fluid, applying a magnetic field containing a gradient of field intensity within said formation, driving the first fluid through the formation and recovering the first fluid.

5. The process of claim 1 or 4 wherein the first fluid is a bitumen-containing solvent stream and the subterranean formation contains tar sands.

6. The process of claims 1 or 4 wherein the first fluid comprises kerogen and the porous formation is an oil shale.

7. The process of claims 1 or 4 wherein the magnetic field has a strength of from 1 to 20,000 gauss.

8. The process of claims 1 or 4 wherein the field intensity increases in the direction from the first fluid toward the ferrofluid fluid.

* * * * *